United States Patent [19]

Fite et al.

[11] Patent Number: 5,373,552
[45] Date of Patent: Dec. 13, 1994

[54] TONE BURST GENERATOR

[75] Inventors: Wayne C. Fite, Elmhurst; William F. Pranaitis, Jr., St. Charles, both of Ill.

[73] Assignee: AT&T Corp., Murray Hill, N.J.

[21] Appl. No.: 13,454

[22] Filed: Feb. 4, 1993

[51] Int. Cl.⁵ .................. H04N 17/00; H04N 15/00
[52] U.S. Cl. .............................. 379/146; 379/153; 379/154; 379/155; 379/132
[58] Field of Search ............... 379/132, 143, 144, 145, 379/146, 153, 154, 155; 375/68; 307/229, 571, 640, 264; 381/123

[56] References Cited

U.S. PATENT DOCUMENTS

| | | | |
|---|---|---|---|
| 2,935,567 | 5/1960 | Anderson | 379/132 |
| 4,719,648 | 1/1988 | Boeckmann | 375/132 X |
| 4,962,520 | 10/1990 | Gozen | 379/146 X |
| 5,168,518 | 12/1992 | Crisenzo et al. | 375/146 X |
| 5,272,398 | 12/1993 | Schroder-Brunloop et al. | 308/571 |

OTHER PUBLICATIONS

"Type TP2 . . . oscillator filter unit", Sodeco-Saia, Information E137a.
A. B. Grebene, *Bipolar and MOS Analog Integrated Circuit Design*, Chapter 9, pp. 451–479, 1984.
P. R. Gray et al., *Analysis and Design of Analog Integrated Circuits*, Second Edition, pp. 590–605, 1984.
*The Radio Amateur's Handbook*, 1978, pp. 352–354.

Primary Examiner—Stephen Chin
Assistant Examiner—Paul Loomis
Attorney, Agent, or Firm—Ross T. Watland

[57] ABSTRACT

A tone burst generator where a continuous tone voltage is applied across two series-connected semiconductor switches each having an ON state and an OFF state. A first control circuit controls the state of the first switch and the variable impedance in an intermediate region between its ON and OFF states to cause gradual, well-defined OFF/ON and ON/OFF transitions of the first switch. As a result of these first switch transitions, a voltage tone burst is generated that has precisely defined edges to eliminate clicking noise. The continuous tone voltage is of only one polarity—it has a non-zero DC component and an AC component having a peak-to-peak variation less the twice the magnitude of the non-zero DC component. A second control circuit controls the state of the second switch and the variable impedance in an intermediate region between its ON and OFF states to cause well defined ON/OFF and OFF/ON transitions of the second switch.

12 Claims, 2 Drawing Sheets

TONE BURST GENERATOR

TECHNICAL FIELD

This invention relates to apparatus for generating tone bursts with a precisely-controlled envelope and, more particularly, to such generators that are used in telephony for periodic pulse metering.

BACKGROUND AND PROBLEM

In many countries outside the United States, telephone line circuits frequently include tone burst generators for use with periodic pulse metering (PPM) telephone lines. The generators transmit tone bursts to telephone station equipment for use in incrementing call cost meters and in controlling coin collection at public telephones. It is important to control the tone burst envelope to avoid in-band noise resulting in audible clicking on the line. Since it is necessary to have one generator per PPM line, the unit cost of such generators is a very significant factor.

In one prior art arrangement, tone bursts are generated by turning an oscillator filter unit ON and OFF. However, since the oscillator filter units include inductors, the unit size and cost are negative factors.

In a second prior an arrangement, tone bursts are generated using a four-quadrant linear multiplier circuit. The circuit cost is again too high. In addition, a reduction in the idle channel noise—the magnitude of the tone which persists after a tone burst is over—would be desirable.

SOLUTION

These problems are solved and a technical advance is achieved in accordance with the invention in an exemplary tone burst generator where a continuous tone voltage is applied advantageously across the combination of two series-connected semiconductor switches each having an ON state and an OFF state. A first control circuit controls the state of the first switch and, significantly, the variable impedance in an intermediate region between its ON and OFF states to cause gradual, well-defined OFF/ON and ON/OFF transitions of the first switch. As a result of these first switch transitions, a voltage tone burst is generated that has precisely defined edges to eliminate clicking noise. The tone burst is generated at the interconnection between the first and second switch means. The OFF/ON and ON/OFF transitions of the first switch each have a duration greater than three times the period of the continuous tone voltage. Illustratively, the continuous tone voltage is of only one polarity—it has a non-zero DC component and an AC component having a peak-to-peak variation less than twice the magnitude of the non-zero DC component. Because of the single polarity of the continuous tone voltage, there is no need for a costly, four-quadrant linear multiplier. A second control circuit controls the state of the second switch and the variable impedance in an intermediate region between its ON and OFF states to cause well defined ON/OFF and OFF/ON transitions of the second switch.

A tone burst generator in accordance with the present invention includes first and second semiconductor switches each having at least first and second terminals. Each switch has an ON state, corresponding to a low impedance between its first and second terminals, and an OFF state, corresponding to a high impedance between its first and second terminals. At least the first switch also has an intermediate region between its ON and OFF states corresponding to a variable impedance between its first and second terminals where the variable impedance varies between the low impedance of the first switch and the high impedance of the first switch. The second terminal of the first switch and the first terminal of the second switch are interconnected. A continuous tone voltage having a given period is applied between the first terminal of the first switch and the second terminal of the second switch. A first control circuit controls the state of the first switch and the variable impedance of the first switch in its intermediate region to cause an OFF/ON transition and an ON/OFF transition of the first switch to generate a voltage tone burst at the interconnection between the first and second switches. The OFF/ON and OFF/ON transitions of the first switch each have a duration greater than three times the given period. A second control circuit controls the state of the second switch to cause an ON/OFF transition and an OFF/ON transition of the second switch. The ON/OFF transition of the second switch is substantially contemporaneous with the OFF/ON transition of the first switch and the OFF/ON transition of the first switch is substantially contemporaneous with the ON/OFF transition of the second switch. Following the OFF/ON transition of the second switch the ON state of the that switch causes the voltage tone burst to have a substantially zero AC component.

Illustratively, the tone burst voltage is applied to a telephone line for periodic pulse metering. The continuous tone voltage has a non-zero DC component and an AC component having a peak-to-peak variation less than twice the magnitude of the non-zero DC component.

The second switch also has an intermediate region between the ON and OFF states and corresponding to a variable impedance between the first and second terminals of the second switch. The variable impedance varies between the low impedance of the second switch and the high impedance of the second switch. The second control circuit controls the variable impedance of the second switch in its intermediate region. The OFF/ON transition of the second switch has a duration greater than three times the period of the continuous tone voltage.

The first switch has a control terminal. The first control circuit transmits a first control voltage to the control terminal of the first switch. The first control voltage has a leading edge and a trailing edge corresponding respectively to the OFF/ON transition and the ON/OFF transition of the first switch. The first control circuit includes a first capacitor and a circuit for charging, exponentially with a time constant T1, the first capacitor to develop the first control voltage leading edge and discharging, exponentially with a time constant T2, the first capacitor to develop the first control voltage trailing edge, where $T2 > T1$.

The second switch also has a control terminal. The second control circuit transmits a second control voltage to the control terminal of the second switch. The second control voltage has a leading edge and a trailing edge corresponding respectively to the ON/OFF transition and the OFF/ON transition of the second switch. The second control circuit includes a second capacitor and a circuit for discharging, exponentially with a time constant T3, the second capacitor to develop the second control voltage leading edge and charging, exponentially with a time constant T4, the second capacitor to develop the second control voltage trailing edge, where T4>T3 and TI>T3.

The tone burst generator includes an input port to enable the charging and discharging circuit of the first control circuit and the discharging and charging circuit of the second control circuit. The tone burst generator also includes a continuous tone voltage generator which generates the continuous tone voltage having a non-zero DC component. The voltage tone burst generated at the interconnection of the first and second switches has a non-zero DC component. A circuit level shifts, amplifies and filters the voltage tone burst to provide an output voltage having a substantially zero DC component.

DRAWING DESCRIPTION

FIG. 1 is a circuit diagram of an exemplary tone burst generator in accordance with the invention; and FIGS. 2–6 comprise a waveform timing diagram for a number of signals within the tone burst generator of FIG. 1.

DETAILED DESCRIPTION

Figure 1:
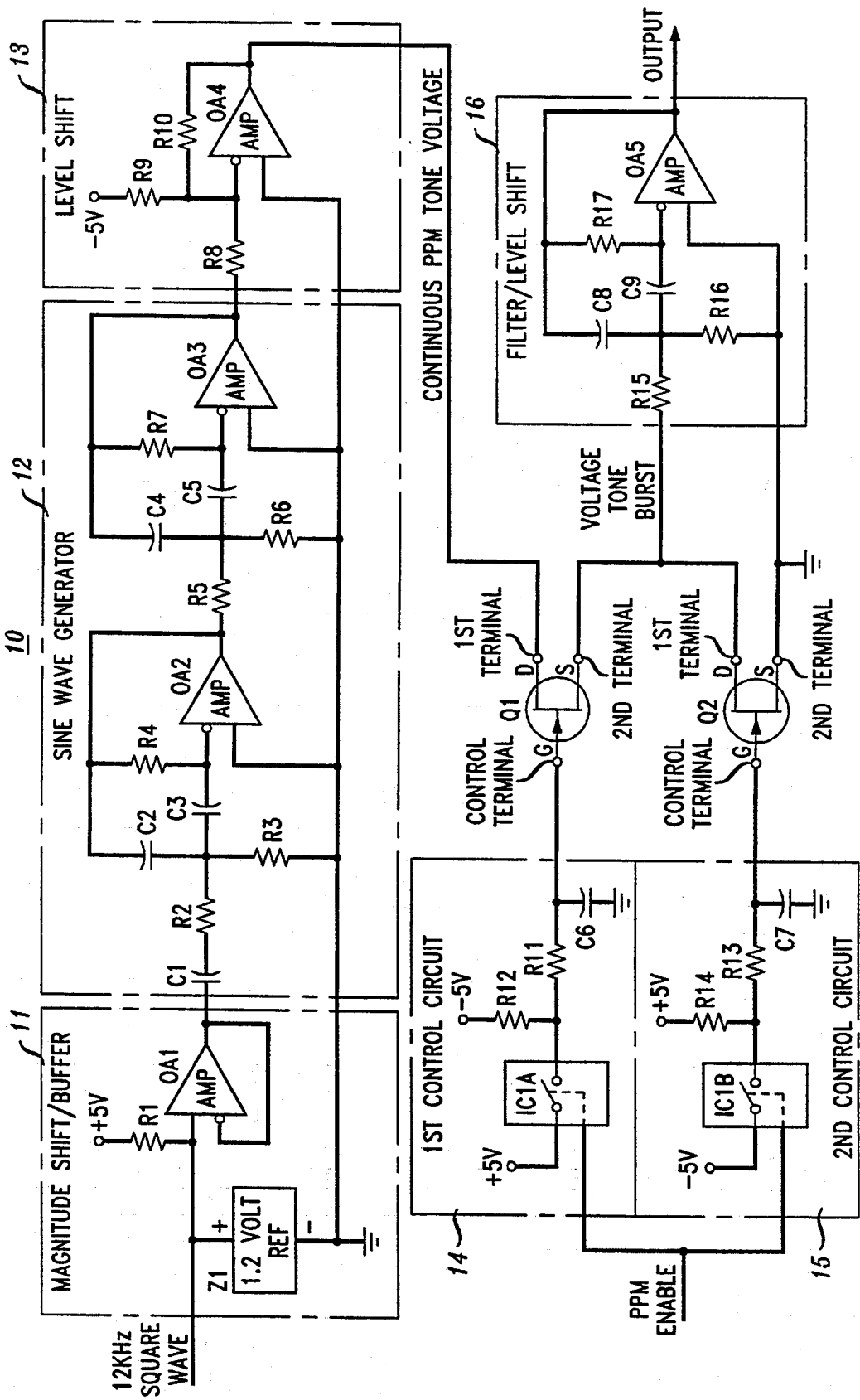

FIG. 1 is a circuit diagram of an exemplary tone burst generator 10 in accordance with the invention. Generator 10 is included in a switching system line circuit (not shown) for use with a periodic pulse metering (PPM) line (not shown). A 12 kilohertz, transistor-transistor logic (TTL) level square wave is received by a magnitude shift/buffer unit 11. Unit 11 includes a 1.2 volt reference Z1, a pull-up resistor R1 and an operational amplifier OA1. Unit 11 converts the input signal from the TTL-level square wave having a wide voltage tolerance to a 1.2-volt square wave having a narrow voltage tolerance. Amplifier OA1 performs a buffering function to prevent reference Z1 from becoming heavily loaded.

The 1.2-volt square wave is transmitted to a sine wave generator 12 including two series-connected, multiple-feedback, active filter stages each configured in a bandpass configuration and having a quality factor Q=2. A narrow magnitude tolerance is maintained because of the relatively low quality factors of the filter stages. The output of an operational amplifier OA3 is a 12 kilohertz sine wave centered about zero volts and having a peak-to-peak variation of 1.36 volts. Generator 12 rejects the harmonic components of the incoming square wave except the fundamental 12 kilohertz.

Figure 2:
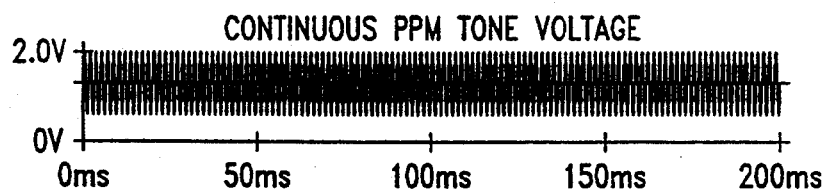

The zero-centered 12 kilohertz sine wave is transmitted to a level shift unit 13 which shifts the sine wave to a DC level of +1.3 volts (FIG. 2). The shifted sine wave, referred to herein as a continuous PPM tone voltage, has a period of 83.3 microseconds and is applied across two series-connected, field effect transistors (FETs) Q1 and Q2. Each FET Q1 and Q2 has a drain (1st) terminal D, a source (2nd) terminal S, and a gate (control) terminal G. Each FET Q1 and Q2 has an ON state, corresponding to a low impedance between its terminals D and S, an OFF state, corresponding to a high impedance between its terminals D and S, and an intermediate region between the ON and OFF states and corresponding to a variable impedance between the ON-state low impedance and the OFF-state high impedance.

Figure 3:
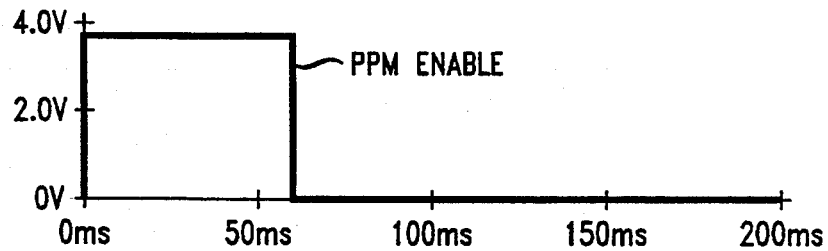
Figure 4:
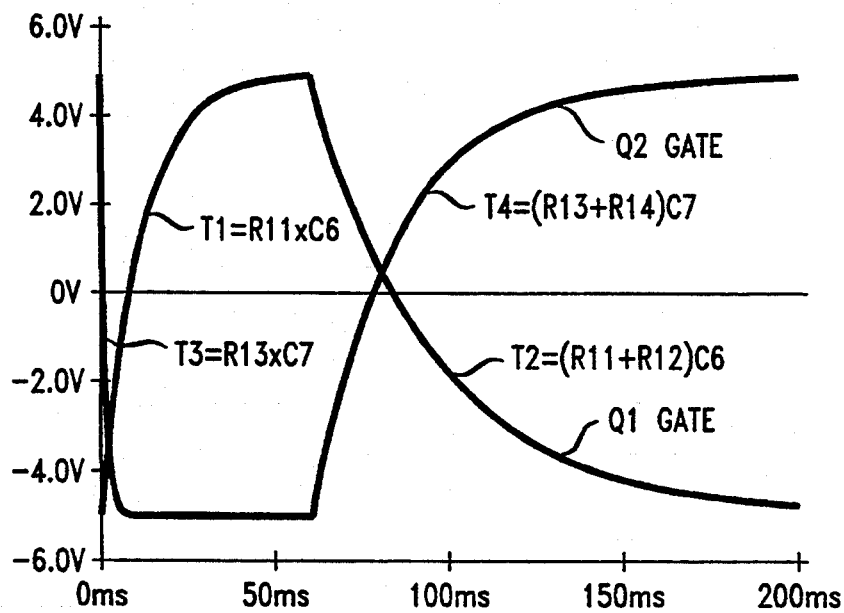
Figure 5:
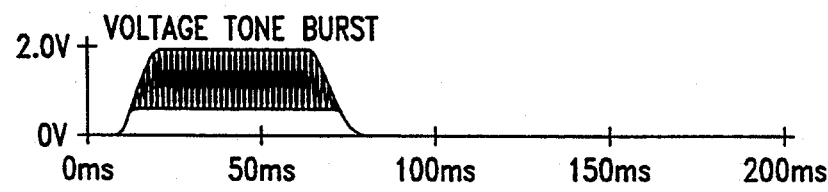
Figure 6:
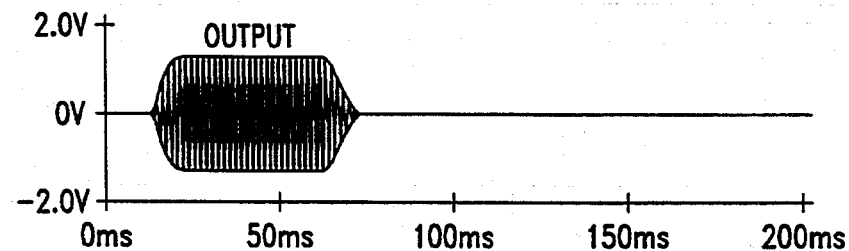

FETs Q1 and Q2 are controlled by control circuits 14 and 15, respectively, which transmit first and second control voltages to the FET Q1 and Q2 G terminals. A TTL-level PPM enable pulse (FIG. 3) is applied to control a linear switch IC1A included in control circuit 14. When the enable pulse is not applied, Q1 terminal G is at −5 volts. When the enable pulse is applied, Q1 terminal G gradually increases, with an exponential time constant T1=R11×C6, from −5 volts to +5 volts (FIG. 4). When the enable pulse is removed, Q1 terminal G gradually decreases, with an exponential time constant T2=(R11 +R12)C6, from +5 volts to −5 volts. The voltage changes at Q1 terminal G are effected by charging and discharging a capacitor C6 and result in OFF/ON and ON/OFF transitions of Q1 each having a duration which is longer than the period of the 12 kilohertz continuous PPM tone voltage, e.g., more than three times as long. (Note that the sinusoids shown in FIGS. 2, 5 and 6 are not drawn to time scale.)

The TTL-level PPM enable pulse is also applied to control a linear switch IC1B included in control circuit 15. When the enable pulse is not applied, Q2 terminal G is at +5 volts. When the enable pulse is applied, control circuit Q2 terminal G decreases, with an exponential time constant T3=R13×C7, from +5 volts to −5 volts (FIG. 4). When the enable pulse is removed, Q2 terminal G gradually increases, with an exponential time constant T4=(R13+R14)C7, from −5 volts to +5 volts. The voltage changes at Q2 terminal G are effected by discharging and charging a capacitor C7 and result in ON/OFF and OFF/ON transitions of Q2. The duration of the Q2 OFF/ON transition is longer than the period of the 12 kilohertz continuous PPM tone voltage, e.g., more than three times as long.

As a result of the operation of control circuit 14 and FET Q1, a voltage tone burst (FIG. 5) is generated at the interconnection between FETs Q1 and Q2. Note that the voltage tone burst does not begin until the Q1 terminal G voltage has risen sufficiently that Q1 begins its transition from its OFF state into its intermediate region.

Since the same TTL-level PPM enable pulse is applied to both control circuits 14 and 15, the ON/OFF transition of Q1 is contemporaneous with the OFF/ON transition of Q2, and the OFF/ON transition of Q1 is contemporaneous with the ON/OFF transition of Q2. The tone burst leading edge is gradual since it does not start until the Q1 terminal G voltage increase has become gradual. The tone burst trailing edge is also gradual since T2>T1 and T4>T3. Because these edges are gradual, there is no audible clicking generated at the telephone station. Since TI>T3, the precision of the Q1 terminal G voltage rise is enhanced because it depends on the values of only R11 and C6. Following the OFF/ON transition of Q2, the ON state of Q2 provides an AC path from the interconnection at terminal D to ground thereby reducing the AC component of the voltage tone burst to substantially zero, e.g., less than −50 dBm0.

A filter/level shift unit 16 filters out any in-band noise resulting from the non-linearity of FETs Q1 and Q2. Capacitors C8 and C9 reduce the DC component of the voltage tone burst from +1.3 volts to substantially zero. Operational amplifier OA5 amplifies the signal. The resulting output voltage (FIG. 6) is transmitted on the PPM telephone line, via a line driver (not shown in FIG. 1).

The component values for tone burst generator 10 are given in Table 1. Note that the values are for 12 kilohertz operation. The values would be adjusted for operation at other frequencies, e.g., 16 kilohertz.

TABLE 1

| | |
|---|---|
| R1 | 4.64 kΩ |
| R2 | 8.06 kΩ |
| R3 | 1.15 kΩ |
| R4 | 16.2 kΩ |
| R5 | 8.06 kΩ |
| R6 | 1.15 kΩ |
| R7 | 16.2 kΩ |
| R8 | 10 kΩ |
| R9 | 38.3 kΩ |
| R10 | 10 kΩ |
| R11 | 49.9 kΩ |
| R12 | 105 kΩ |
| R13 | 4.99 kΩ |
| R14 | 110 kΩ |
| R15 | 4.02 kΩ |
| R16 | 1.33 kΩ |
| R17 | 16.2 kΩ |
| C1 | 0.22 kμf |
| C2 | 3300 pf |
| C3 | 3300 pf |
| C4 | 3300 pf |
| C5 | 3300 pf |
| C6 | 0.22 μf |
| C7 | 0.22 μf |
| C8 | 3300 pf |
| C9 | 3300 pf |
| Q1,Q2 | Motorola 2N7002 |
| OA1-OA5 | Motorola 33179 |
| IC1A,IC1B | Motorola HC4316 |
| Z1 | Motorola LM385-1.2 |

It is to be understood that the above-described embodiment is merely illustrative of the principles of the invention and that many variations may be devised by those skilled in the an without departing from the spirit and scope of the invention. It is therefore intended that such variations be included within the scope of the claims.

We claim:

1. A tone burst generator comprising
   first and second semiconductor switch means each having at least a first terminal and a second terminal and each having an ON state, corresponding to a low impedance between said first and second terminals, and an OFF state, corresponding to a high impedance between said first and second terminals, said first switch means also having an intermediate region between said ON and OFF states and corresponding to a variable impedance between said first and second terminals of said first switch means, said variable impedance varying between said low impedance of said first switch means and said high impedance of said first switch means,
   means for interconnecting said second terminal of said first switch means and said first terminal of said second switch means,
   means for applying a continuous tone voltage having a given period between said first terminal of said first switch means and said second terminal of said second switch means,
   first control means for controlling the state of said first switch means and the variable impedance of said first switch means in its intermediate region to cause an Off/ON transition and an ON/OFF transition of said first switch means to generate a voltage tone burst at said interconnecting means, said OFF/ON and ON/OFF transitions of said first switch means each having a duration greater than three times said given period, and
   second control means for controlling the state of said second switch means to cause an ON/OFF transition and an OFF/ON transition of said second switch means, said ON/OFF transition of said second switch means being substantially contemporaneous with said OFF/ON transition of said first switch means, said OFF/ON transition of said second switch means being substantially contemporaneous with said ON/OFF transition of said first switch means, the ON state of said second switch means causing said voltage tone burst at said interconnecting means to have a substantially zero AC component following the OFF/ON transition of said second switch means.

2. A generator in accordance with claim 1 further comprising
   means for applying said voltage tone burst to a telephone line for periodic pulse metering.

3. A generator in accordance with claim 1 where said continuous tone voltage has a non-zero DC component and an AC component having a peak-to-peak variation less than twice the magnitude of said non-zero DC component.

4. A generator in accordance with claim 1 where said second switch means also has an intermediate region between said ON and OFF states and corresponding to a variable impedance between said first and second terminals of said second switch means, said variable impedance of said second switch means varying between said low impedance of said second switch means and said high impedance of said second switch means,
   where said second control means controls the variable impedance of said second switch means in its intermediate region, said OFF/ON transition of said second switch means having a duration greater than three times said given period.

5. A generator in accordance with claim 4 where said first switch means has a control terminal, where said first control means transmits a first control voltage to the control terminal of said first switch means, said first control voltage having a leading edge and a trailing edge corresponding respectively to said OFF/ON transition and said ON/OFF transition of said first switch means.

6. A generator in accordance with claim 5 where said first control means includes a first capacitor and means for charging, exponentially with a time constant T1, said first capacitor to develop said first control voltage leading edge and discharging, exponentially with a time constant T2, said first capacitor to develop said first control voltage trailing edge, where T2>T1.

7. A generator in accordance with claim 6 where said second switch means has a control terminal, where said second control means transmits a second control voltage to the control terminal of said second switch means, said second control voltage having a leading edge and a trailing edge corresponding respectively to said ON/OFF transition and said OFF/ON transition of said second switch means.

8. A generator in accordance with claim 7 where said second control means includes a second capacitor and means for discharging, exponentially with a time constant T3, said second capacitor to develop said second control voltage leading edge and charging, exponentially with a time constant T4, said second capacitor to develop said second control voltage trailing edge, where T4>T3.

9. A generator in accordance with claim 8 where T1>T3.

10. A generator in accordance with claim 8 further comprising
 means for enabling said charging and discharging means of said first control means and said discharging and charging means of said second control means.

11. A generator in accordance with claim 1 further comprising means for generating said continuous tone voltage.

12. A generator in accordance with claim 1 where said voltage tone burst has a non-zero DC component and further comprising
 means for level shifting, amplifying and filtering said voltage tone burst to provide a generator output voltage having a substantially zero DC component.

* * * * *

UNITED STATES PATENT AND TRADEMARK OFFICE
CERTIFICATE OF CORRECTION

PATENT NO. : 5,373,552

DATED : December 13, 1994

INVENTOR(S) : Wayne C. Fite, William F. Pranaitis

It is certified that error appears in the above-indentified patent and that said Letters Patent is hereby corrected as shown below:

Column 2, line 27, after "switch" first occurrence, add a comma,

Column 2, line 27, "of the that" should be "of that".

Signed and Sealed this

Thirty-first Day of October 1995

Attest:

BRUCE LEHMAN

Attesting Officer    Commissioner of Patents and Trademarks